(12) United States Patent
Carston et al.

(10) Patent No.: US 8,447,772 B2
(45) Date of Patent: May 21, 2013

(54) ENERGY MONETARY COST AWARE QUERY OPTIMIZATION

(75) Inventors: Lynnette E. Carston, Rochester, MN (US); Samuel J. Miller, Rochester, MN (US); Gary E. Rohret, Rochester, MN (US); Jeffrey W. Tenner, Rochester, MN (US); Alwood P. Williams, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 12/821,453

(22) Filed: Jun. 23, 2010

(65) Prior Publication Data

US 2011/0320434 A1    Dec. 29, 2011

(51) Int. Cl.
*G06F 7/00*    (2006.01)
(52) U.S. Cl.
USPC ........................................ 707/759

(58) Field of Classification Search
USPC .................... 707/759, 713, 706, 736, 809
See application file for complete search history.

(56) References Cited

U.S. PATENT DOCUMENTS

| | | |
|---|---|---|
| 7,523,094 B1 | 4/2009 | Thiemann et al. |
| 2002/0194180 A1* | 12/2002 | Alsop et al. ..................... 707/10 |
| 2009/0254916 A1* | 10/2009 | Bose et al. ..................... 718/104 |
| 2009/0281986 A1 | 11/2009 | Bestgen et al. |
| 2009/0282272 A1 | 11/2009 | Bestgen et al. |
| 2010/0161145 A1* | 6/2010 | Baeza-Yates et al. ........ 700/291 |

* cited by examiner

*Primary Examiner* — Truong Vo
(74) *Attorney, Agent, or Firm* — Patterson & Sheridan, LLP

(57) ABSTRACT

Embodiments of the invention provide a method of optimizing a query, including determining an execution plan for use in executing the query, based on a monetary cost of the energy needed to execute the query. A query optimization component may determine a plurality of execution plans for the query. The query optimization component may then select one of the plans to use in executing the query based on the monetary cost calculated for the plan.

18 Claims, 7 Drawing Sheets

ENERGY MONETARY COST AWARE QUERY OPTIMIZATION

BACKGROUND

1. Field

The present invention generally relates to query optimization. And more particularly, to optimizing a query based on energy monetary cost.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined such that it can be reorganized and accessed in a number of different ways. A distributed database is a database that can be dispersed or replicated among different points in a network. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests are commonly made using high-level query languages such as the Structured Query Language (SQL) and application programming interfaces (API's) such as Java® Database Connectivity (JDBC). The term "query" denominates a set of commands for retrieving data from a stored database. Queries take the form of a command language, such as the Structured Query Language (SQL), that lets programmers and programs select, insert, update, find out the location of data, and so forth.

Generally speaking, any requesting entity can issue queries against data in a database. For example, software applications, operating systems, and, at the highest level, users may submit queries to the database. These queries may be pre-defined (i.e., hard coded as part of an application) or may be generated in response to input (e.g., user input). Once the query is submitted, the database may execute the query against the data in the database and return a query result to the requesting entity.

Often times, for a given query, the database may be capable of executing the query in many different ways, with each execution method returning the same query result. For example, a database may have two different methods of scanning a database table: a normal scan and a parallel scan. In this example, while both scans return the same data from the table, the parallel scan may return this data more quickly, but with increased power consumption. As such, if the increased execution time from using the normal scan is a non-factor, the database owner may prefer to avoid using the parallel scan in order to reduce power consumption.

Currently, methods exist for optimizing database queries and query execution in order to reduce power consumption. However, while these techniques may result in less power usage, they do not always result in reduced monetary cost. For example, in an example where power cost differs depending on the time of day, it may be less expensive to use the faster parallel scanning technique (and thus use more power) during a less expensive time period in order to avoid using power during a more expensive time period. Thus, while these known techniques may result in reduced power consumption, this benefit may come with an increased monetary cost.

SUMMARY

One embodiment of the invention provides a method of optimizing a query, including receiving a query submitted for execution. The method also includes determining a plurality of execution plans for the query. Additionally, the method includes, for each execution plan in the plurality of execution plans, determining a power consumption value for the execution plan, and determining a monetary cost for executing the query according to the execution plan, based on one or more pricing values and the determined power consumption value for the execution plan. The method further includes selecting a first execution plan from the plurality of execution plans to use in executing the query, wherein the first execution plan is selected based on the determined monetary cost for the first execution plan.

Another embodiment of the invention provides a computer-readable storage medium containing a program which, when executed, performs an operation. The operation includes receiving a query submitted for execution. The operation also includes determining a plurality of execution plans for the query. Additionally, the operation includes, for each execution plan in the plurality of execution plans, determining a power consumption value for the execution plan, and determining a monetary cost for executing the query according to the execution plan, based on one or more pricing values and the determined power consumption value for the execution plan. The operation further includes selecting a first execution plan from the plurality of execution plans to use in executing the query, wherein the first execution plan is selected based on the determined monetary cost for the first execution plan.

Yet another embodiment of the invention provides a system, including a computer processor and a memory containing a program that, when executed on the computer processor, performs an operation for optimizing a query. The operation includes receiving a query submitted for execution. The operation also includes determining a plurality of execution plans for the query. Additionally, the operation includes, for each execution plan in the plurality of execution plans, determining a power consumption value for the execution plan, and determining a monetary cost for executing the query according to the execution plan, based on one or more pricing values and the determined power consumption value for the execution plan. The operation further includes selecting a first execution plan from the plurality of execution plans to use in executing the query, wherein the first execution plan is selected based on the determined monetary cost for the first execution plan.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
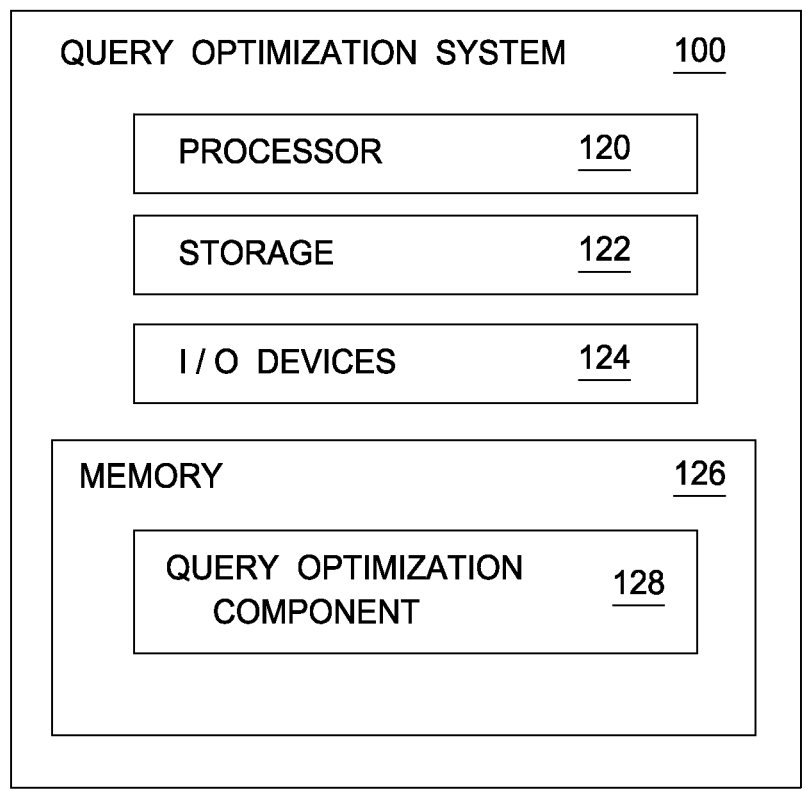
FIG. 1 is a block diagram of components of a computer system configured to run a query optimization component, according to one embodiment of the invention.

Embodiments of the invention generally provide a method of optimizing a query based on monetary cost. A query optimization component may determine a plurality of execution plans for a query. The query optimization component may then select one of the execution plans to use based on a monetary cost calculated for the plan.

In one embodiment, the energy plan component may first receive a database query. After receiving the query, the energy plan component may then generate a plurality of execution plans for the database query. Each execution plan may include a list of operations to perform to execute the query and a schedule in which to perform the operations. Once the plans are generated, the energy plan component may determine a power usage for executing the query according to each of the executions plans. Additionally, the energy plan component may access a pricing structure that specifies a price for energy consumption at varying times. The energy plan component may then use the pricing structure in conjunction with the determined power usage to determine a monetary cost for each plan. Once the monetary cost for each plan is determined, the energy plan component may select an execution plan to use in executing the query based on the determined monetary cost.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a block diagram of components of a computer system configured to run a query optimization component, according to one embodiment of the invention. As shown, the query optimization system 100 includes computer processor(s) 120, storage media 122, one or more I/O devices 124, system memory 126, and a query optimization component 128. Computer processor 120 may be any processor capable of performing the functions described herein. I/O devices 124 may represent a variety of input and output devices, including keyboards, mice, visual displays, printers and so on. Furthermore, as will be understood by one of ordinary skill in the art, any computer system capable of performing the functions described herein may be used.

In the pictured embodiment, memory 126 contains a query optimization component 128. The memory 126 may include one or more memory devices having blocks of memory associated with physical addresses, such as random access memory (RAM), read only memory (ROM), flash memory or other types of volatile and/or non-volatile memory. The query optimization component 128 may generally receive a query and generate an optimized execution plan for the query, where the execution plan is optimized based on a monetary cost for executing the query.

In one embodiment, the query optimization component may receive a query and generate a plurality of execution plans for the query. The query optimization component may then determine a power usage for each of the executions plans. Using a pricing structure in conjunction with the determined power usage, the query optimization component may determine a monetary cost for each plan. The query optimization component may then select the execution plan with the lowest determined monetary cost for use in executing the query.

In another embodiment, the execution plan with the lowest monetary cost may not be the execution plan that completes the fastest. For example, assume the price of power is currently price $P_2$ per unit of power, but in 30 minutes the price of power will decrease to price $P_1$ per unit. If the execution of the query is not time-sensitive, meaning some delay in executing the query is acceptable, the query optimization component may select an execution plan that delays the execution of the query for 30 minutes, in order to take advantage of the less expensive price of power $P_1$ per unit of power.

In yet another embodiment, because the price of power may vary depending on the time, the execution plan with the lowest monetary cost may not be the execution plan with the lowest power consumption. For example, assume the price of power is currently price $P_1$ per unit of power, but in 30 minutes the price of power will increase to $P_2$ per unit. Depending on the difference between price $P_1$ and price $P_2$, it may be cheaper (in terms of monetary cost) to use more processing resources and finish executing the query in the next 30 minutes, rather than to process the query in a more energy efficient manner but pay the premium price of $P_2$ for the processing beyond the first 30 minutes.

Figure 2:
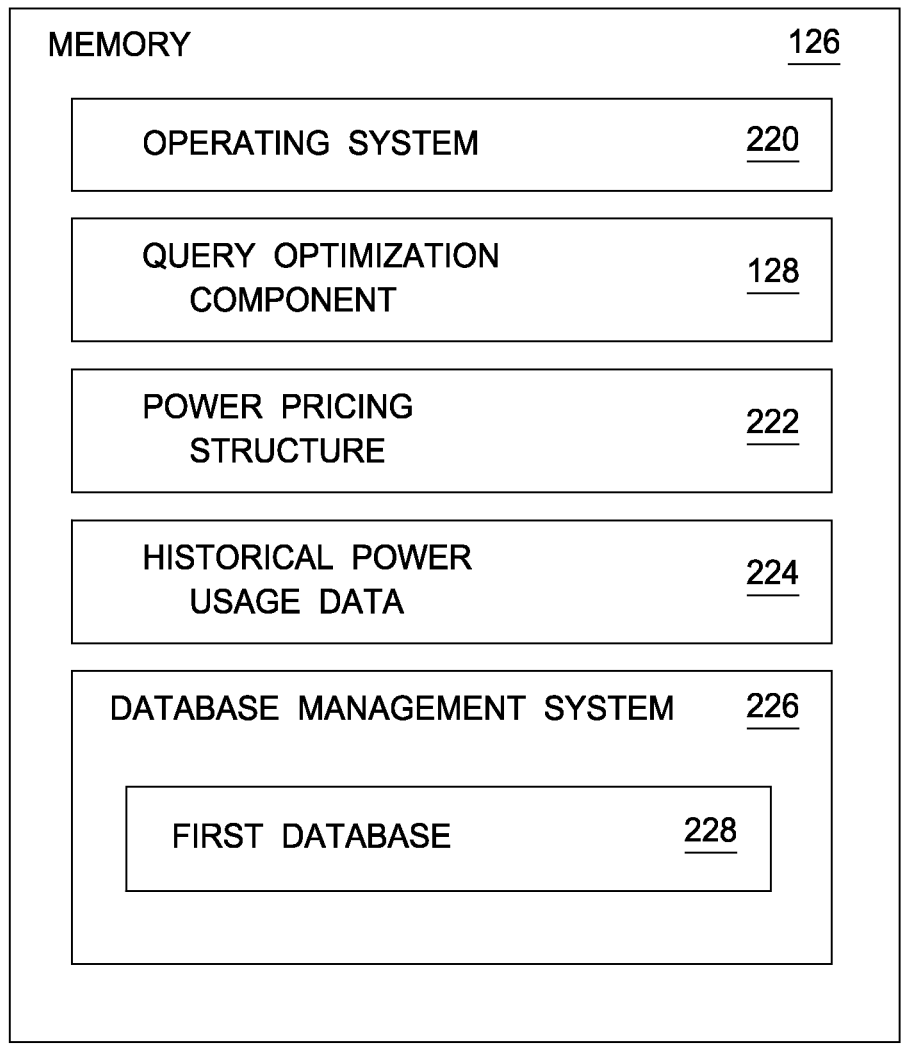
FIG. 2 is a block diagram of a computer memory of the computer system of FIG. 1, according to one embodiment of the invention.

FIG. 2 is a block diagram of a computer memory of the computer system of FIG. 1, according to one embodiment of the invention. As shown, the memory 126 includes an operating system 220, a query optimization component 128, a power pricing structure 222, historical power usage data 224 and a database management system (DBMS) 226. The DBMS 226 contains a first database 228. Of course, the operating system 220 may be any operating system capable of performing the functions described herein. Furthermore, while in the pictured embodiment the DBMS 226 is shown in the same memory (and thus same computer system) as the query optimization component 128, this is not necessarily the case. In another embodiment, the query optimization component 128 and the DBMS 226 reside on different computer systems, and database queries are first sent to the query optimization component 128 to be optimized, and then subsequently sent by the query optimization component 128 to the DBMS 226 for execution.

The memory 126 also includes a power pricing structure 222. The power pricing structure 222 may contain prices per unit of power consumption. In one embodiment, the power pricing structure 222 may contain different prices for power for different times of day. For example, a power company may charge a premium for power consumption at peak hours, and this pricing scheme may be reflected in the power pricing structure 222. As a second example, a business may take advantage of solar power during daylight hours. As such, the cost of power usage during these hours may be reduced. This information may be reflected in the power pricing structure 222.

Memory 126 also contains historical power usage data 224. The historical power usage data 224 may include information about an amount of power consumed by previously executed queries. In one embodiment, the power usage data 224 also contains information about the power consumption of particular database operations that were previously used in executing a query. That is, the power usage data 224 may contain power usage information for all low-level operations used previously in executing queries. For example, as part of executing a previous query, the DBMS 226 may have performed a scan on a table T. In this example, the power usage data 224 may contain information indicating that the previous scan of table T consumed 10 units of power. Continuing this example, assuming that more than one low-level database operation was performed in executing the previous query, the power usage data 224 may also contain information indicating that a total of 80 units of power were consumed in executing the previous query.

Figure 3:
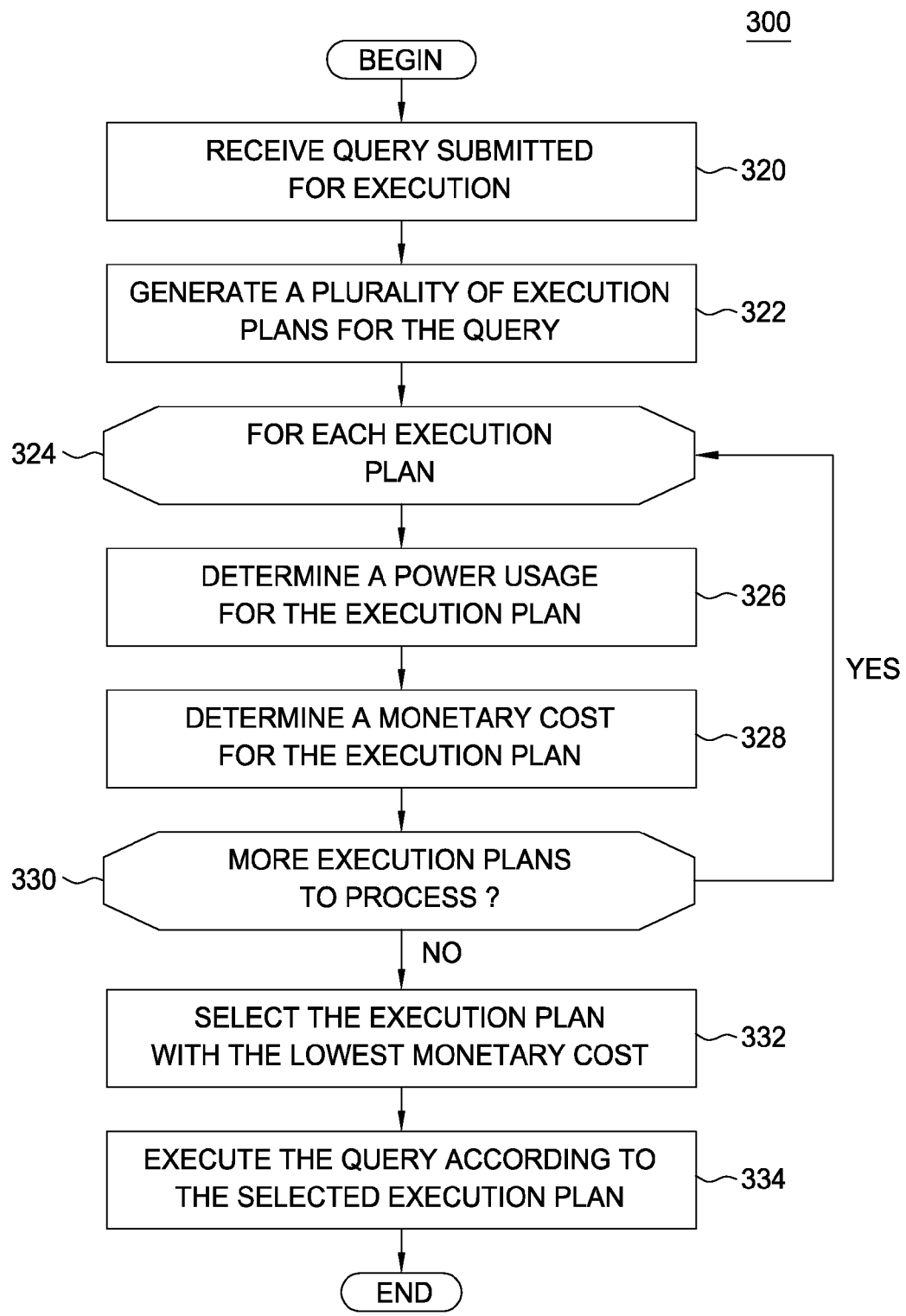
FIG. 3 is a flow diagram illustrating a method for optimizing a query based on monetary cost, according to one embodiment of the invention.

FIG. 3 is a flow diagram illustrating a method for optimizing a query based on monetary cost, according to one embodiment of the invention. As shown, the method 300 begins at step 320, where the query optimization component 128 receives a query submitted for execution. Once the query is received, the query optimization component 128 generates a plurality of execution plans for use in executing the query (step 322). In one embodiment, a preset number and preset type of execution plans are generated. For example, the query optimization component 128 may generate a first plan including a delay time, a second plan including high-performance processing operations, and a third plan using standard processing operations. In another embodiment, the query optimization component 128 may use more dynamic techniques for generating the plurality of execution plans. For example, the query optimization component 128 may a Monte Carlo method to randomly generate a number of execution plans.

Once the execution plans are generated, the method 300 enters a loop at step 324, and for each execution plan in the plurality of execution plans, the query optimization component 128 determines a power usage value for the execution plan (step 326). The query optimization component 128 may determine the power usage value by comparing the received query, as if it were executed according to the execution plan, to data in the historical power usage data 224. In one embodiment, the query optimization component 128 uses information from subsystem-level power monitors to estimate the energy requirements for using different combinations of processor, memory, disk, I/O, etc., in combination with an estimation of the processor, memory, disk, and I/O required to implement each portion of the execution plan to determine the power usage value for the execution plan. In another embodiment, the query optimization component 128 compares the received query and the execution plan to data for similar previously-executed queries stored in the power usage data 224.

In yet another embodiment, the query optimization component 128 first determines a number of database operations used to execute the query according to the execution plan. Once the database operations are determined, the query optimization component 128 may estimate a power consumption value for each database operation, based on data in the historical power usage data 224 for previously executed database operations. For instance, assume the power usage data 224 contains data indicating that a previous table scan of table T consumed 10 units of power. If the query optimization component 128 determines that the received query, if executed according to the execution plan, will include a second scan of table T, the query optimization component 128 may estimate that the second scan will also consume 10 units of power. The above examples of ways to determine the power usage value are intended for illustrative purposes only. Of course, other techniques for determining a power usage value may be used instead.

Once the power consumption for the execution plan has been calculated, the query optimization component 128 determines a monetary cost associated with the execution plan (step 328). In making this determination, the query optimization component 128 may reference pricing values contained in the power pricing structure 222. For example, assume that the power pricing structure 222 indicates that power currently costs $1.00 per power unit. If the query optimization component 128 previously determined that executing the query according to the execution plan will consume 50 units of power (step 326), then the query optimization component 128 may calculate that the monetary cost for the execution plan is $50.00 (step 328). Once the monetary cost is calculated, the query optimization component 128 then determines if there are more execution plans to process (step 330). If there are more execution plans, the loop begins again (step 324).

However, if there are no more execution plans to process, the query optimization component 128 then selects the execution plan with the lowest determined monetary cost (step 332). As discussed above, the execution plan with the lowest cost may be neither the execution plan that consumes the least amount of power, nor the execution plan that completes execution of the query in the shortest amount of time. Once the execution plan with the lowest monetary cost has been selected, the query optimization component 128 sends the query to the DBMS 226, where query is then executed in accordance with the selected execution plan (step 334). Once the query has been executed, the method 300 ends.

Figure 4:
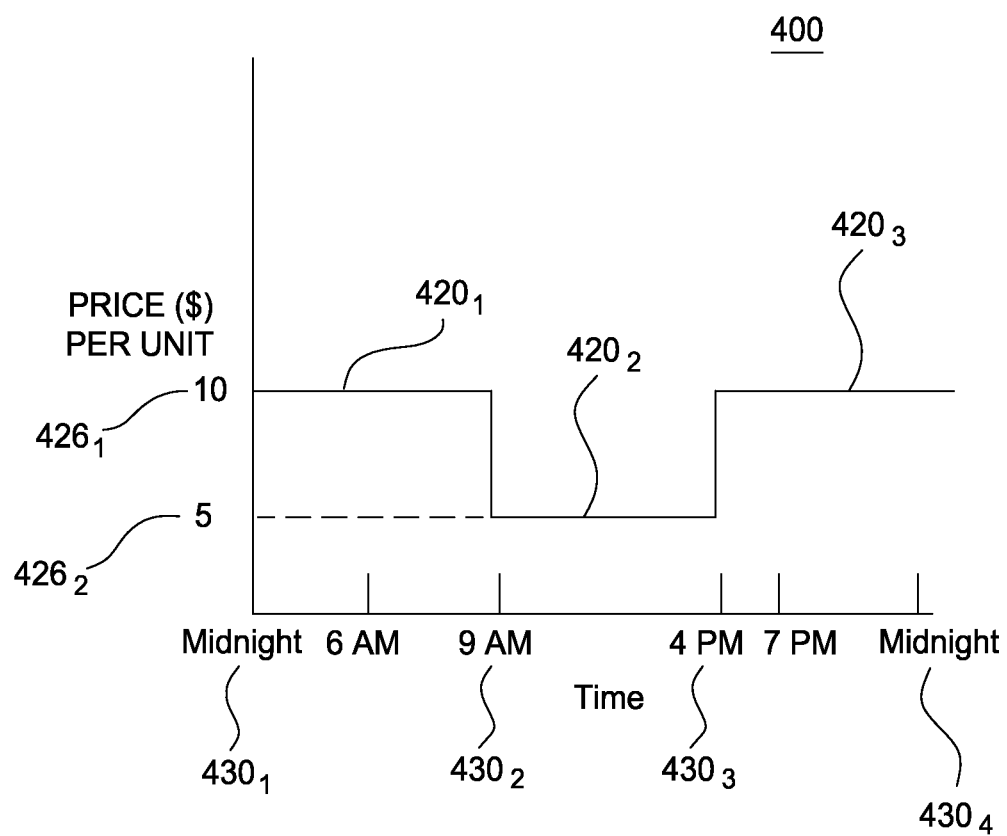
FIG. 4 is a graph showing an exemplary power price schedule, according to one embodiment of the invention.

FIG. 4 is a graph showing an exemplary power pricing schedule, according to one embodiment of the invention. In this example, the graph 400 represents a power pricing schedule 222 for a business that owns a number of solar panels, and as such is able to operate its query optimization system 100 using solar power during the hours of 9:00 am and 4:00 pm. As shown, the graph 400 includes three pricing levels 420. Each pricing level 420 corresponds to a price 426 per unit of power and a time range. The time range may be specified by two time values 430. For example, the time range may include a start time value 430 and an end time value 430. Thus, for example, pricing level $420_1$ corresponds to a price $426_1$ of $10.00 per unit of power, and a time range beginning at start time midnight $430_1$ and end time 9:00 am $430_2$. As a second example, pricing level $420_2$ corresponds to a price $426_2$ of $5.00 per unit of power, and a time range beginning at start time 9:00 am $430_2$ and end time 4:00 pm $430_3$. Thus, FIG. 4 shows an exemplary power price schedule 222 where the price for power varies depending on the time of day. Furthermore, although the price of power in this example varies because of solar power, other factors may cause the price of power to shift depending on the time of day. For instance, a power company may charge a premium for power usage during peak hours, but may charge a reduced rate for power usage during off-peak hours.

Figure 5A:
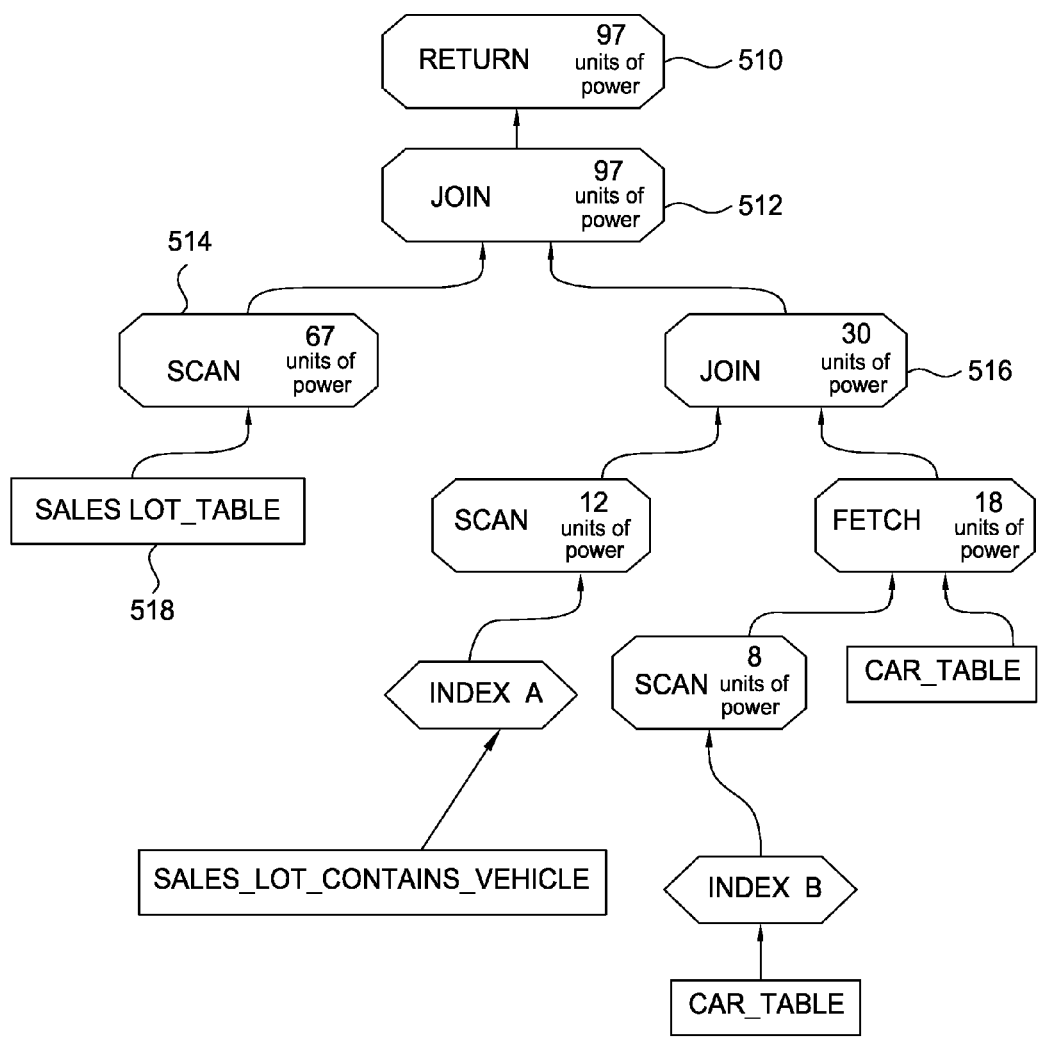
FIGS. 5A-5C are block diagrams of execution plans used to execute a database query, according to one embodiment of the invention.
Figure 5B:
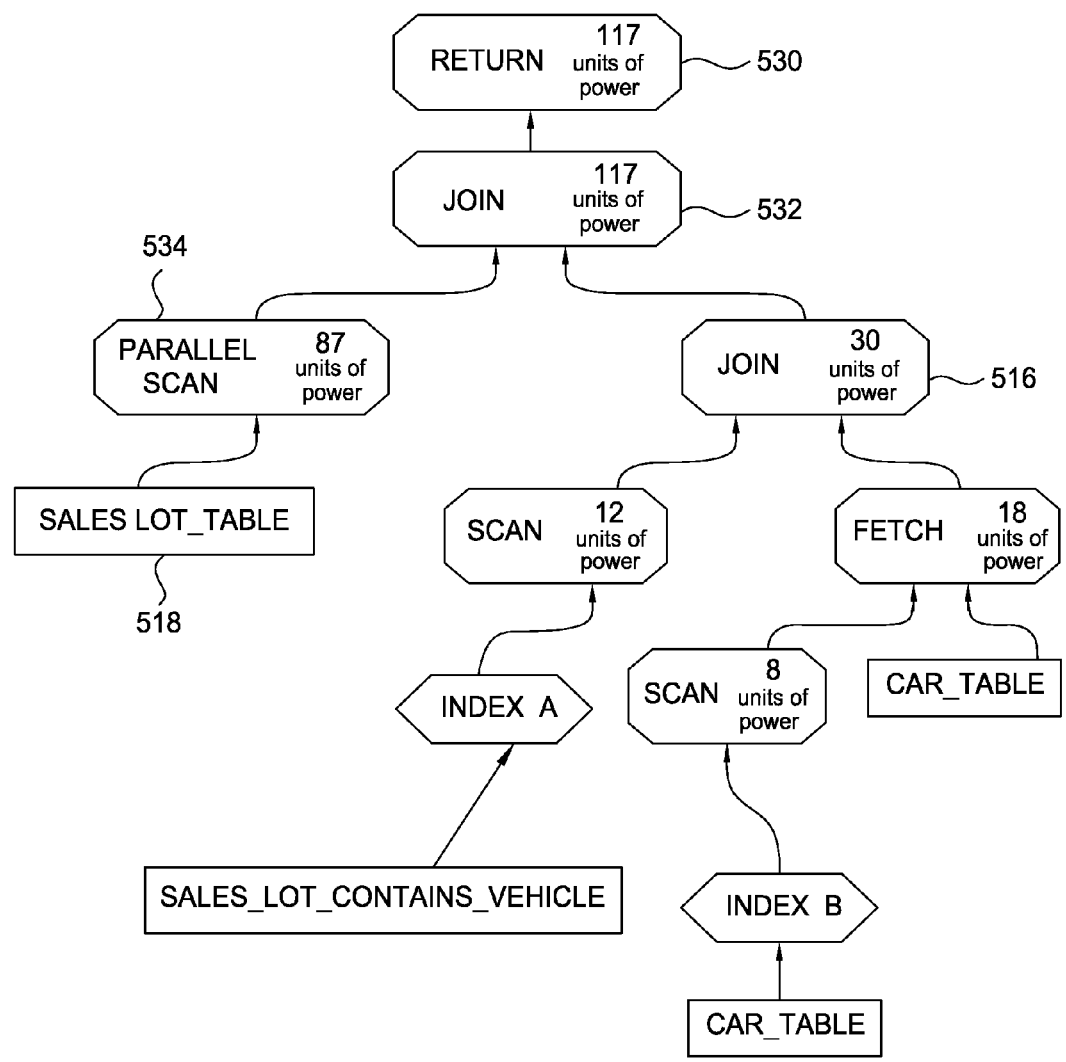
Figure 5C:
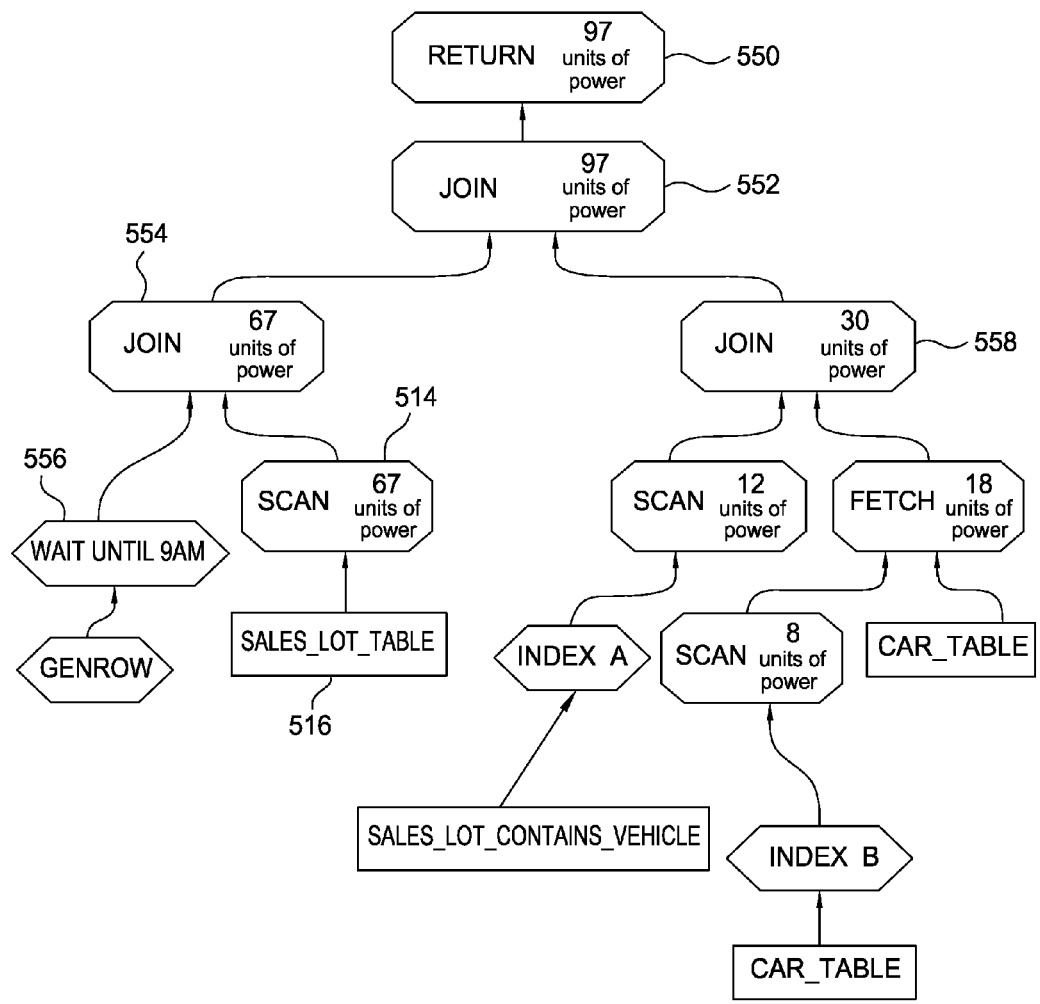

FIGS. 5A-5C are block diagrams of execution plans used to execute a database query, according to one embodiment of the invention. More specifically, FIGS. 5A-5C show exemplary groupings of low-level database operations that may be used to execute the database query shown in Table 1. FIG. 5A shows an execution plan 500 that includes database operations that may be used to perform the query of Table 1. As shown, each node in the execution plan 500 includes a database operation and power consumption value indicating an amount of power used to perform the operation. Furthermore, the power consumption value in each node in the execution plan 500 includes all of the power consumption values of the child nodes. For example, the SCAN operator 514 of table SALES_LOT_TABLE 518 consumed 67 units of power, while the JOIN operator 516 only required 30 units of power. The SCAN operator 514 and JOIN operator 516 are combined using another JOIN operator 512, and the query results are returned to the requestor using a RETURN operator 510. As shown, in this particular example, the total power consumption value for executing the database query was 97 power units, as indicated in the node for RETURN operator 510.

TABLE 1

Exemplary Database Query

SELECT T1.OID, T1.CARPROP1, T1.CARPROP2
FROM CAR_TABLE T1, SALES_LOT_CONTAINS_VEHICLE T2, SALES_LOT_TABLE T3
WHERE T1.OID = T2.SOURCEID AND T3.OID = T2.TARGETID

FIG. 5B shows an execution plan 520 of database operations that may be used to execute the optimized query of Table 2, according to an embodiment of the invention. As shown, Table 2 includes a similar query to the query of Table 1, but further includes the clause "OPTIMIZE FOR ENERGY PRICE COMPLETE BEFORE 7:00 PM." In one embodiment, a user may append this clause to the query manually. In another embodiment, the query optimization component 128 may insert the clause automatically. The decision to insert the clause automatically may be based on factors such as predetermined configuration data, the historical power usage data 224 and the power pricing structure 222.

TABLE 2

Exemplary Optimized Database Query

SELECT T1.OID, T1.CARPROP1, T1.CARPROP2
FROM CAR_TABLE T1, SALES_LOT_CONTAINS_VEHICLE T2,
SALES_LOT_TABLE T3
WHERE T1.OID = T2.SOURCEID AND T3.OID = T2.TARGETID
OPTIMIZE FOR ENERGY PRICE COMPLETE BEFORE 7:00PM

As shown, FIG. 5B shows an execution plan 520 containing database operations that may be used to execute the database query specified in Table 2. The execution plan 520 is similar to the execution plan 500 of FIG. 5A, but includes a PARALLEL SCAN operator 534. In this example, while the PARALLEL SCAN operator 534 may fetch the same data from the SALES_LOT_TABLE 518 as the SCAN operator 514, if executed against the same database, the PARALLEL SCAN operator 534 does so more quickly (i.e., the operation takes less time to execute). However, as shown, the PARALLEL SCAN operator 534 has a power consumption value of 87 units of power, which is 20 units higher than the power consumption value of SCAN operation 514. Thus, when the results of the PARALLEL SCAN operator 534 are merged with the results of the JOIN operator 536, using another JOIN operator 532, and then returned using the RETURN operator 530, the total power consumption value for executing the query is 117 units of power. In other words, while the group of data operations shown in the execution plan 520 may return the same data as the execution plan 500 from FIG. 5A, the operations in execution plan 520 did so at the cost of 20 additional units of power.

However, although the operations in the execution plan 520 consume additional units of power, the operations may still be optimized based on monetary cost. For example, assume that at 7:00 pm, the cost of power usage increases substantially because the computer system running the DBMS 226 can no longer be powered using solar power. Furthermore, assume that the current time is 6:30 pm, and the group of operations shown in execution plan 500 takes one hour to complete, whereas the group of operations shown in execution plan 520 takes 30 minutes to complete. In this example, it may be less expensive in terms of monetary cost to use the group of database operations shown in execution plan 520 (including the PARALLEL SCAN operator 534) to complete the execution of the query before 7:00 pm, in order to avoid the substantial price increase in the cost of power. That is, in this example, even though the operations in execution plan 520 cost 20 additional units of power, they may be less expensive in terms of monetary cost because of changes in the price of power based on the time of day.

FIG. 5C shows an alternate example of an execution plan 540 optimized for monetary cost and containing database operations used to perform the database query specified in Table 2. That is, the execution plan 540 shows a third example of a way to return the same results in response to executing the database query against the same database, but unlike the execution plan 500 of FIG. 5A, execution plan 540 is optimized according to monetary cost. In this example, however, while the SCAN operator 514 still returns results from the SALES_LOT_TABLE 518, it is combined with a DELAY operator 556 that delays the processing until 9:00 am. For this example, assume that the owner of the query optimization system 100 may purchase power from a power company at all hours of the day, but that solar power is available from solar panels owned by the owner starting at 9:00 am in the morning. Furthermore, assume that the locally-owned solar power is substantially less expensive per power unit consumed than the power available from the power company.

As shown, the execution plan 540 includes an optimized group of database operations that may be used to execute the database query. Specifically, the execution plan 540 includes SCAN operator 514 and DELAY operator 556 that are combined using the JOIN operator 554. The result of this combination is combined with JOIN operator 558 using another JOIN operator 552. The result of the other JOIN operator 552 is then returned to the requestor by RETURN operator 550. In this example, similar to the execution plan 500, execution plan 540 includes a JOIN operator 552 and a RETURN operator 550, consuming a total of 97 units of power. Thus, the total power consumption used in execution plan 540 is the same as the power consumption of execution plan 500.

However, unlike the execution plan 500, the execution plan 540 is optimized based on monetary cost, according to one embodiment of the invention. That is, because the execution plan 540 includes the DELAY operator 556 that delays the processing of the SCAN operator 514 until 9:00 am, the group of operations in execution plan 540 may take advantage of the less expensive solar power. In this example, the query optimization component 128 has determined that even if processing of the query (specified in Table 2) is delayed until 9:00 am, the processing will still complete before 7:00 pm. In other words, because the query includes the clause "OPTIMIZE FOR ENERGY PRICE COMPLETE BEFORE 7:00 PM", the query optimization component 128 must first estimate how long the query will take to execute, and ensure that execution of the query can still complete prior to the specified time, before the component 128 can determine if and how long to delay the processing of the query. Thus, because the query optimization component 128 determined that less expensive power became available starting at 9:00 am, and further determined that the query, if delayed until 9:00 am, would still finish processing before 7:00 pm, the query optimization component 128 constructed the execution plan shown in execution plan 540 to optimize the query based on monetary cost. As such, in this example, even though the execution plan 540 consumes the same amount of power as the execution plan 500, execution plan 540 does so at reduced monetary cost. Furthermore, even though the execution plan 540 takes longer to complete than execution plan 500 (because of the DELAY operator 556), execution plan 540 is still less expensive in terms of monetary cost in these circumstances.

Although FIG. 5B shows an example using more resources (including power) to process a query more quickly, and FIG. 5C shows an example using a delay timer to process a query at less expensive times, these methods are not necessarily mutually exclusive. That is, in one embodiment, the query optimization component 128 may determine that the most efficient execution plan, in terms of monetary cost, includes both using more resources for portions of the query processing and delaying processing of other portions of the query until a different time. As an example, the query optimization component 128 may determine that it is most efficient in terms of monetary cost to perform as much processing as possible while solar power is available. However, it may further determine that not all of the processing for the query can be completed before the solar power becomes unavailable, and that for a short amount of time after the solar power becomes unavailable, power from the power company is sold at a premium because it is during peak power hours. As such, the query optimization component 128 may create an execution plan that consumes additional power resources while the solar power is available (e.g., using the PARALLEL SCAN operation 534), but then delays the rest of the processing (e.g., using the DELAY operator 556) until off-peak hours. By doing this, the query optimization component 128 may create an execution plan that optimizes the execution of the query to minimize monetary cost. While the above examples show several ways of optimizing a query based on monetary cost, these examples are intended for illustrative purposes only and are not meant as a limitation. Of course, the above operators may be combined with each other, and with other operators capable of optimizing a query for monetary cost, in ways other than are listed above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of optimizing a query, comprising:
    determining a plurality of execution plans for executing a query, wherein each of the plurality of execution plans represents an alternative way of executing the query relative to the other execution plans in the plurality of execution plans, and wherein each of the plurality of execution plans includes a plurality of operations to be performed in executing the query and a schedule in which to perform operations in the plurality of operations;
    for each of the plurality of execution plans:
        determining a power consumption value for the execution plan, wherein the power consumption value approximates an amount of power that would be consumed by executing the query using the respective execution plan; and
        determining a monetary cost for executing the query according to the execution plan, based on one or more pricing values and the determined power consumption value for the execution plan;
    selecting a first execution plan from the plurality of execution plans to use in executing the query, based on the determined monetary cost for the first execution plan; and
    executing the query according to the first execution plan, wherein an entirety of the query is executed once the first execution plan is completed.

2. The method of claim 1, wherein the first execution plan includes a delay time value, and wherein execution of at least a portion of the query is delayed for an amount of time specified in the delay time value.

3. The method of claim 1, wherein the power consumption value determined for the first execution plan is greater than the power consumption value for at least one other execution plan in the plurality of execution plans.

4. The method of claim 1, The method of claim 1, wherein the first execution plan includes using additional processing resources in order to expedite execution of the query.

5. The method of claim 1, wherein the one or more pricing values specify power usage prices at one or more different times.

6. The method of claim 1, wherein the received query includes a completion time value that specifies a time by which execution of the query must be completed, and wherein executing the query according to the first execution plan finishes before the complete time value included in the query.

7. A computer-readable storage medium containing a program which, when executed, performs an operation, comprising:
    determining a plurality of execution plans for executing a query, wherein each of the plurality of execution plans represents an alternative way of executing the query relative to the other execution plans in the plurality of execution plans, and wherein each of the plurality of execution plans includes a plurality of operations to be performed in executing the query and a schedule in which to perform operations in the plurality of operations;
    for each of the plurality of execution plans:
        determining a power consumption value for the execution plan, wherein the power consumption value approximates an amount of power that would be consumed by executing the query using the respective execution plan; and
        determining a monetary cost for executing the query according to the execution plan, based on one or more pricing values and the determined power consumption value for the execution plan;
    selecting a first execution plan from the plurality of execution plans to use in executing the query, wherein the first execution plan is selected based on the determined monetary cost for the first execution plan; and
    executing the query according to the first execution plan, wherein an entirety of the query is executed once the first execution plan is completed.

8. The computer-readable storage medium of claim 7, wherein the first execution plan includes a delay time value, and wherein execution of at least a portion of the query is delayed for an amount of time specified in the delay time value.

9. The computer-readable storage medium of claim 7, wherein the power consumption value determined for the first execution plan is greater than the power consumption value for at least one other execution plan in the plurality of execution plans.

10. The computer-readable storage medium of claim 7, wherein the first execution plan includes using additional processing resources in order to expedite execution of the query.

11. The computer-readable storage medium of claim 7, wherein the one or more pricing values specify power usage prices at one or more different times.

12. The computer-readable storage medium of claim 7, wherein the received query includes a completion time value that specifies a time by which execution of the query must be completed, and wherein executing the query according to the first execution plan finishes before the complete time value included in the query.

13. A system, comprising:
a computer processor; and
a memory containing a program that, when executed on the computer processor, performs an operation for optimizing a query, comprising:
determining a plurality of execution plans for executing a query, wherein each of the plurality of execution plans represents an alternative way of executing the query relative to the other execution plans in the plurality of execution plans, and wherein each of the plurality of execution plans includes a plurality of operations to be performed in executing the query and a schedule in which to perform operations in the plurality of operations;
for each of the plurality of execution plans:
determining a power consumption value for the execution plan, wherein the power consumption value approximates an amount of power that would be consumed by executing the query using the respective execution plan; and
determining a monetary cost for executing the query according to the execution plan, based on one or more pricing values and the determined power consumption value for the execution plan;
selecting a first execution plan from the plurality of execution plans to use in executing the query, wherein the first execution plan is selected based on the determined monetary cost for the first execution plan; and
executing the query according to the first execution plan, wherein an entirety of the query is executed once the first execution plan is completed.

14. The system of claim 13, wherein the first execution plan includes a delay time value, and wherein execution of at least a portion of the query is delayed for an amount of time specified in the delay time value.

15. The system of claim 13, wherein the power consumption value determined for the first execution plan is greater than the power consumption value for at least one other execution plan in the plurality of execution plans.

16. The system of claim 13, wherein the first execution plan includes using additional processing resources in order to expedite execution of the query.

17. The system of claim 13, wherein the one or more pricing values specify power usage prices at one or more different times.

18. The system of claim 13, wherein the received query includes a completion time value that specifies a time by which execution of the query must be completed, and wherein executing the query according to the first execution plan finishes before the complete time value included in the query.

* * * * *